US011997554B2

(12) United States Patent
Lu et al.

(10) Patent No.: US 11,997,554 B2
(45) Date of Patent: May 28, 2024

(54) SMART UE CELL SELECTION AND RESELECTION

(71) Applicant: T-Mobile USA, Inc., Bellevue, WA (US)

(72) Inventors: Kun Lu, Bellevue, WA (US); Egil Gronstad, Encinitas, CA (US); Alan Denis MacDonald, Bellevue, WA (US); Scott Francis Migaldi, Cary, IL (US); John Humbert, Roeland Park, KS (US); Brett L. Christian, Independence, MO (US); Hsin Fu Henry Chiang, Bellevue, WA (US); William M. Shvodian, McLean, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 135 days.

(21) Appl. No.: 17/708,696

(22) Filed: Mar. 30, 2022

(65) Prior Publication Data
US 2023/0319658 A1 Oct. 5, 2023

(51) Int. Cl.
H04W 36/06 (2009.01)
H04W 36/00 (2009.01)

(52) U.S. Cl.
CPC ..... H04W 36/06 (2013.01); H04W 36/00835 (2018.08)

(58) Field of Classification Search
CPC ..... H04W 48/20; H04W 76/14; H04W 76/19; H04W 48/16; H04W 8/22; H04W 88/06;
(Continued)

(56) References Cited

U.S. PATENT DOCUMENTS

2016/0073304 A1 3/2016 Dahlén
2016/0330676 A1* 11/2016 Thangarasa ........... H04W 76/14
(Continued)

FOREIGN PATENT DOCUMENTS

CN 105530699 B 4/2016
EP 2384060 A1 2/2011

OTHER PUBLICATIONS

Extended European Search Report dated Jul. 26, 2023 for European Patent Application No. 23159733.7, 11 pgs.
(Continued)

Primary Examiner — David Q Nguyen
(74) Attorney, Agent, or Firm — Lee & Hayes, P.C.

(57) ABSTRACT

System and methods for smart cell selection and reselection are described. A mobile device may attempt to camp on a cell in a tracking area that has advertised a particular frequency band. If the mobile device is unable to recognize an information element identifying a different subset of the advertised frequency band than that supported by the mobile device, the mobile device will store a record of the tracking area and the advertised frequency band and compare future cell information broadcasts to the entry, avoiding attempts to operate within cells in the same tracking area advertising the same frequency. In this way the mobile device conserves resources by avoiding actions in incompatible cells and avoids storing information about many cells by only storing the tracking area information.

18 Claims, 4 Drawing Sheets

(58) Field of Classification Search
CPC ..... H04W 8/005; H04W 88/10; H04W 48/04; H04W 48/18; H04W 64/00
USPC .............................. 370/328, 329, 330, 331
See application file for complete search history.

(56) References Cited

U.S. PATENT DOCUMENTS

| 2018/0152890 | A1* | 5/2018 | Jia ..................... H04W 52/0203 |
| 2018/0152978 | A1* | 5/2018 | Jia ......................... H04W 76/28 |
| 2022/0015029 | A1* | 1/2022 | Wang .............. H04W 36/00835 |
| 2022/0078746 | A1 | 3/2022 | Lee et al. |
| 2022/0417811 | A1* | 12/2022 | Xin ....................... H04W 36/06 |

OTHER PUBLICATIONS

Ericsson, "NS_55 in NR CA", Feb. 20, 2022, https://ftp.3gpp.org/tag_ran/WG2_RL2/TSGR2_117-e/Docs/R2-2203706.zip R2-2203706NS_55 in CA.docx, vol. RAN WG2, No. Electronic Meeting;Feb. 21, 2022-Mar. 3, 2022, 6 pg.

* cited by examiner

SMART UE CELL SELECTION AND RESELECTION

BACKGROUND

With the rapid growth in the number of wireless communications devices (e.g., user devices such as mobile telephones, smartphones, tablets, laptops, etc.) in use, the networks that provide services to such devices have grown to accommodate them. Along with a large increase in the number of network devices deployed to provide services to user devices, the bandwidth available for providing such services has also expanded. However, there are many user devices that are unable to communicate on newly introduced bands that may be available to a user device in a wireless network. Efficiently supporting these legacy devices while concurrently supporting devices configured to operate on relatively newly available bands on current networks may pose a challenge for a network operator.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
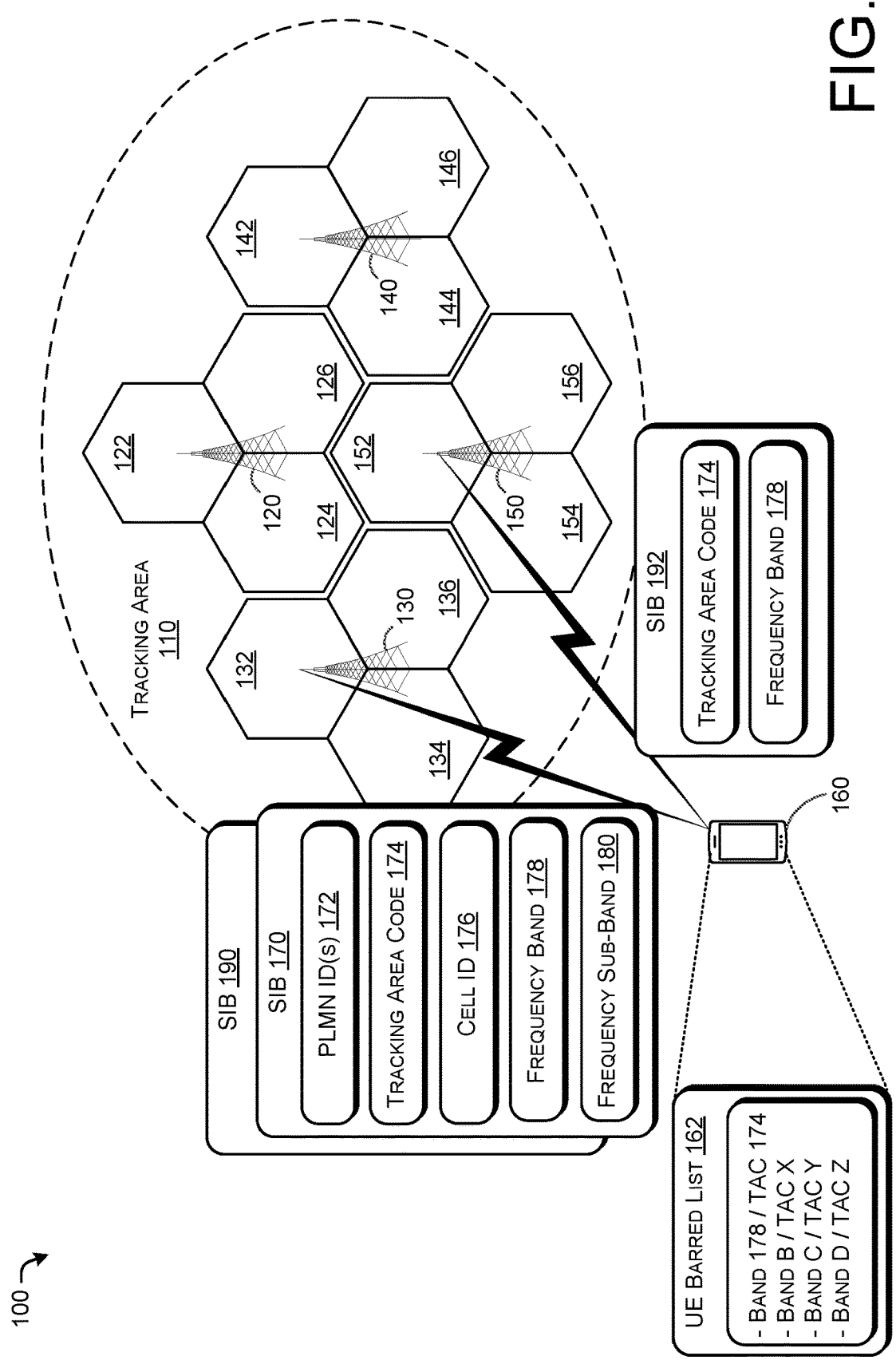
FIG. 1 is a schematic diagram of an illustrative wireless communication network environment in which systems and techniques for UE cell selection and reselection may be implemented, in accordance with examples of the disclosure.

This disclosure is directed in part to systems and techniques for more efficiently performing user equipment (UE) cell selection and/or reselection. In conventional systems, a UE will receive one or more messages from a base station advertising information about the base station and the one or more cells that it services. For example, a base station may periodically broadcast one or more messages that include information indicating one or more cells associated with the base station, one or more frequencies or bands of frequencies supported by the one or more cells associated with the base station, one or more networks and/or service providers associated with the base station and/or it associated one or more cells, the availability of the one or more cells associated with the base station to provide services to a UE, and/or various other information.

One or more bands of frequencies advertised by a base station may include frequencies that some UEs cannot support. For example, an advertised band of frequencies for a particular cell may include newly available frequencies that a (e.g., legacy) UE may not be configured for, or capable of, supporting. For instance, a first subset of the frequencies within a particular band (e.g., "band X" for example purposes) may be generally supported by legacy and current UEs. At some time after such legacy UEs may have been put into operation, a second, different subset of the frequencies within band X may be made available. In response, network equipment may be deployed and/or configured to support the second subset of frequencies. Among such network equipment may be base stations that may advertise that they support a cell using the band X of frequencies. However, these base stations may provide service in band X using the second subset of frequencies that may not be supported by all legacy UEs. For example, in the newer systems configured to support the newer second subset of frequencies, to distinguish this new second subset of frequencies cell from the older first subset of frequencies, a new system message information element (IE) (e.g., "NS_xx") may be broadcast in cells using the newer second subset of frequencies within band X. Legacy devices may not understand this new information in the broadcast message and may therefore treat the in which the message was broadcast as barred In this situation, a UE may receive a broadcast message from a base station advertising a cell that the base station supports using band X, which the UE may also support, but the UE may only use the first subset of the frequencies within band X. the broadcast message may include a new IE as described above that clarified that the cell supports the newer second subset of frequencies. However, because the legacy UE cannot properly decipher or otherwise understand this new IE, the legacy UE may determine that it cannot communicate with the base station in that cell and determine that the cell is "barred" (e.g., not available for wireless communications). However, the UE will continue to receive broadcast messages from the base station for that cell, and, after a brief timeout period associated with the barred cell determination, the UE will again attempt to "camp" on that cell by establishing a communications session with the base station. Because the UE cannot communicate using the second subset of the frequencies within band X, the same result will occur (e.g., the UE determines gain that the cell is barred based on not recognizing the new IE indicating the newer second subset of frequencies). This process may be repeated as long as the UE is receiving broadcast messages from the base station indicating that the base station supports band X which the UE also believes it supports, even though the particular frequencies within band X supported by the base station and the UE do not match up. As will be appreciated, this results in a great deal of wasted processing, communications, and UE battery resources.

In a particular example, the n77 band (commonly used in the United States and elsewhere) includes the frequencies from 3.3 GHz to 4.2 GHz. Commonly used bands within the n77 band include the C-band (from 3.70 GHz to 3.98 GHz) and the DoD band (from 3.45 GHz to 3.55 GHz). While the C-band has been used in wireless networks for longer than the DoD band, which was only made available for use in wireless networks in November of 2021 after auction. Network devices and UEs that support the DoD band were introduced shortly thereafter. However, there remain many legacy network devices and UEs that support only the C-band portion of the n77 band and not the DoD band portion.

These legacy UEs may attempt to camp on cells that advertise supporting the n77 band but in fact do not support the C-band and instead support the DoD band. When this happens the UE "bars" the cell but continues to retry camping on the cell as long as it continues to receive a message from the associated base station advertising that the cell supports the n77 band. A typical UE is configured to reattempt connection to an apparently compatible cell 300 seconds after it initially failed to camp on that cell due to determining that the cell is barred. Because a legacy C-band-supporting UE will never successfully establish a connection with a DoD band cell, this cycle will repeat continuously as long as the UE is receiving the broadcast n77 band advertisements from the base station for the cell.

Updated signaling, such as the new IE described above, has been introduced to indicate specifically whether the DoD band or the C-band is supported by an n77 band cell. However, the legacy UEs that are not capable or configured to operate in the DoD band are unlikely to be configured to recognize this new signaling. These UEs may respond to such unrecognized signaling by "barring" the associated cell for a period of time (e.g., 300 seconds) and then attempting again to connect to the cell, resulting in repeating the same inefficient and wasteful cycle.

To further exacerbate the situation, where a base station supports both the C-band and the DoD band, and a UE has successfully camped on the C-band on the associated cell, the DoD band frequencies may appear more attractive to the UE because they are slightly lower than the C-band frequencies and therefore may be detected by the UE as having a better signal level than the C-band frequencies. This may cause the UE to try to initiate a different connection with the cell (e.g., reselect the cell) using the DoD band because the UE has determined the DoD band to have better signal quality. However, because the UE is not capable of communicating fully using the DoD band (e.g., is unable to understand the new IE distinguishing the DoD band from the C-band), the UE will bar the cell and wait for a period of time (e.g., 300 seconds) before attempting to again establish a connection, resulting in an inefficient cycle of wasting resources.

The systems and techniques described herein for UE cell selection and reselection may be implemented to address the inefficient use of UE resources. In various embodiments, a base station (e.g., base transceiver station (BTS), NodeB, eNodeB, gNodeB, etc.) may broadcast a message containing various pieces of network information that can be used by a UE (e.g., any type of wireless device capable of wirelessly interacting with a wireless communications network) to determine whether the UE can access a cell associated with the base station. In examples, this message may be a system information block (SIB), such as a Long-Term Evolution (LTE) or New Radio (NR) SIB (e.g., SIB1, SIB2, SIB3, etc.). While the term "SIB" may be used herein for exemplary purposes to refer to such a message, any message or combination of messages that provide information that may be used by a UE as described herein to access a cell associated with a base station is contemplated as within the scope of this disclosure. While the individual pieces of information included in such messages may be referred to herein as "information elements" (IEs), any one or more pieces of information or data described herein associated with such messages is contemplated as within the scope of this disclosure.

A SIB broadcast by a base station may include, but is not limited to, one or more of a Public Land Mobile Network (PLMN) identifier or a list of PLMN identities, a tracking area code (TAC), a tracking area identifier (TAI), a cell identifier, one or more frequency band identifiers, and one or more frequency sub-band identifiers. In various embodiments, a frequency sub-band identifier may be a frequency range identifiers. For example, a frequency sub-band identifier may indicate a center frequency (e.g., an Absolute Radio Frequency Channel Number (ARFCN) or a 5G Absolute Radio Frequency Channel Number (NR-ARFCN)) and a number of physical resource blocks (PRBs) that used together indicate a frequency range, for example, within the frequency band indicated by the one or more frequency band identifiers.

The PLMN identifier or list of PLMN identities may indicate the one or more PLMN operators or network with which the base station is associated. Each PLMN identifier may include a combination of a mobile country code (MCC) indicating a particular country and a mobile network code (MNC) indicating a particular network (e.g., within the country indicated by the MCC). An MCC may be a three-digit numeric code (e.g., "001") and an MNC may be a two- or three-digit numeric code (e.g., "002"). Therefore, a PLMN identifier may be a five- or six-digit numeric code that combines the MCC and the MNC (e.g., "001-002").

A TAC may indicate a tracking area that may include one or more cells typically in a contiguous geographical region. The number of cells in a particular tracking area may vary from a handful to hundreds or thousands. Each cell within a tracking area may be served by one or more base stations. In many examples, one base station may provide service for multiple cells. In various embodiments, a TAC may provide a (relatively, e.g., in a particular country) local identifier of a tracking area. A TAI may be used to identify a particular tracking globally as the TAI may include a PLMN identifier combined with a TAC. Note that the various functions and systems described herein using a TAC may also, or instead, use a TAI, and all such embodiments are contemplated as within the scope of this disclosure.

A cell identifier may identify a particular cell, for example within the TAC identified in the SIB. A cell identifier may include a local cell identifier (e.g., an E-UTRAN cell identifier (ECI)) and/or a global cell identifier (e.g., an E-UTRAN cell global identifier (ECGI)). A global cell identifier may include a PLMN identifier combined with a local cell identifier.

The one or more frequency band identifiers included in the SIB may indicate one or more operating frequency bands of the cell indicated in the SIB. Such identifiers may be identifiers for a particular set of frequencies rather than an explicit indication of the operating frequency band(s) of the cell. For examples, a frequency band identifier may indicate a legally or regulatorily defined band of frequencies (e.g., n77 band, but not a subset of frequencies of a sub-band like C-band, DoD band, etc.). Alternatively, or in addition, a frequency band identifier may indicate a band defined according to one or more standards (e.g., an E-UTRA operating band, LTE operating band, NR operating band, etc.). Alternately, or in addition, the actual operating frequency band(s) of the cell may be indicated in a SIB.

The one or more frequency sub-band identifiers included in the SIB may indicate one or more operating frequency sub-bands of the cell indicated in the SIB. This may be an IE as described above that distinguishes between two or more subsets of frequencies supported within a particular band of frequencies (e.g., the band of frequencies indicated by the frequency band identifier included in the SIB). This IE may indicate a frequency sub-band in which the cell may operate by indicating, for example, a center frequency (e.g., an ARFCN or a NR-ARFCN) and a number of PRBs that, used together, may indicate a frequency range within the frequency band indicated by the frequency band identifier. This sub-band identifier may also, or instead, be an identifier for a particular set of frequencies rather than an explicit indication of the sub-band of the frequency band(s) of the cell. The sub-band indicated by the one or more frequency sub-band identifiers identifier may indicate a legally or regulatorily defined band of frequencies (e.g., the C-band, the DoD band, etc.) that may be within a larger band of frequencies (e.g., the n77 band). Alternatively, or in addition, a frequency sub-band identifier may indicate a sub-band defined according to one or more standards (e.g., an E-UTRA operating band, LTE operating band, NR operating band, etc.). Alternately, or in addition, the actual frequency sub-band(s) used in the cell may be indicated in the SIB.

In examples, one base station may support multiple cells and may broadcast SIBs associated with each supported cell. The base station may operate each cell in the same frequency band and/or sub-band or may operate cells in different frequency bands and/or sub-bands. For example, a base station may operate one or more cells in the n77 band and may also operate one or more cells in the n41 band. This base station may broadcast SIBs advertising that it supports the n77 band in certain cells and other SIBs advertising that it supports the n41 band in other cells distinct from those that is supports using the n77 band. In examples where a single base station supports cells, SIBs broadcast by the base station for the various cells it supports may include the same information other than the information that differentiates the cell operating frequencies. For example, such SIBs may include the same TAC and cell identifier but a different frequency bandwidth identifier and/or a different frequency sub-band identifier. In some example, such SIBs may include the same TAC, cell identifier, and frequency bandwidth identifier, but may differ (e.g., only) by the one or more frequency sub-band identifier. In other examples, information within SIBs broadcast by a single base station for multiple distinct cells may vary more significantly (e.g., any of the cell identifiers, TACs, frequency identifiers, and/or frequency sub-band identifiers may differ).

In various embodiments, a UE may detect a SIB broadcast by a base station and may determine, based on the information indicated by this SIB, whether to attempt to camp on a cell indicated in the SIB. The UE may determine whether the UE is compatible (e.g., capable of operating in) the frequency band(s) indicated in the SIB. If so, the UE may attempt to communicate with the cell's base station (e.g., using the cell's control channel).

However, the band in which the cell is operating may actually be a subset of the band indicated in the SIB that is not compatible with the UE. For example, the SIB may indicate that the cell operated in the 3.3 GHz-4.2 GHz band, but actually specifically operates (e.g., operate a control channel) within the 3.4 GHz-3.6 GHz band. The SIB may also include a sub-band identifier indicating the 3.4 GHz-3.6 GHz sub-band. The UE, on the other hand, may be capable and/or configured to operate in the 3.7 GHz-4.0 GHz subset of the 3.3 GHz-4.2 GHz band and may not be configured or capable of recognizing the sub-band identifier. In this case, the UE may not detect or understand the control channel communications of the cell's base station that are transmitted within the 3.4 GHz-3.6 GHz band.

In response to a failure to detect or decipher information indicated in SIB, such as the sub-band identifier, and/or a failure to otherwise successfully camp on that cell, the UE may determine that the cell is barred to it. Because this cell is not available for camping at the indicated frequency band(s) to this particular UE, it is unlikely that any other cell within the same TAC will be available for camping to this UE at the same frequency band(s), despite the content of the SIBs associated with such cells. This is because it is very likely that all cells in a particular TAC are configured to use the same particular bands for wireless communications. When a UE moves from one cell to another cell, it is likely to encounter this same issue, particularly when both cells are in the same TAC. Rather than trying to select the same cell again (e.g., after a cell selection timeout period) or other cells in the same TAC, the UE may store an entry in a local (e.g., within the UE) database or listing of barred TAC and frequency band combinations. This entry may include an indication of the TAC indicated in the SIB, an indication of the frequency band(s) indicated in the SIB, and/or a combination thereof.

The UE may access this listing of barred TAC and frequency band combinations in evaluating SIBs. For example, when the UE receives a SIB, it may determine whether the TAC and the frequency band(s) indicated in the SIB correspond to an entry in the listing of barred TAC and frequency band combinations. If so, the UE may be configured to not attempt to camp on the cell indicated in the SIB (because it is likely to be unsuccessful) or take other actions related to that cell, thereby conserving battery and other resources at the UE.

This listing of barred TAC and frequency band combinations may be maintained by the UE for an extended period of time. For example, rather than reevaluating a cell and/or retrying camping on a cell that may appear to be available based on a SIB after a standard or preconfigured period of time (e.g., 300 seconds), if the TAC and frequency band(s) indicated in the SIB correspond to an entry in the UE's listing of barred TAC and frequency band combinations, the UE will not attempt to camp on that cell and/or refrain from taking other actions associated with that cell as long as the entry remains in the listing of barred TAC and frequency band combinations.

The UE may clear or otherwise delete entries in its listing of barred TAC and frequency band combinations in response to detecting one or more events. In various embodiments, a UE may clear, reset, and/or otherwise delete one or more (e.g., all) entries in its listing of barred TAC and frequency band combinations when the UE is powered off (e.g., in response to detecting the initiation of a power down operation). Alternatively or in addition, a UE may clear, reset, and/or otherwise delete one or more (e.g., all) entries in its listing of barred TAC and frequency band combinations when the UE is powered on (e.g., following a power up operation). Alternatively or in addition, a UE may clear, reset, and/or otherwise delete one or more (e.g., all) entries in its listing of barred TAC and frequency band combinations when the UE enters "airplane mode" or another condition where wireless communications are disabled (e.g., in response to detecting an instruction to enter such a condition). Alternatively or in addition, a UE may clear, reset, and/or otherwise delete one or more (e.g., all) entries in its listing of barred TAC and frequency band combinations when the UE exits "airplane mode" or another condition where wireless communications are disabled (e.g., in response to detecting an instruction to exit such a condition and/or enable wireless communications). Other conditions may also, or instead, be detected and used to clear a UE's listing of barred TAC and frequency band combinations.

By facilitating the use of a listing of barred TAC and frequency band combinations to reduce futile camping attempts, systems and methods described herein can improve the performance and increase the efficiency use of UE and network resources, while improving the user experience by reducing unnecessary power consumption. For example, the methods and systems described herein may be more efficient and/or more robust than conventional techniques, as they may increase the efficiency of UE and network resource utilization by reducing unnecessary signaling on the network and power usage by the UE. That is, the methods and systems described herein provide a technological improvement over existing testing systems and processes by facilitating an improved user experience and increase network efficiency, reducing the use of UE and common resources to execute multiple camping attempts that are unlikely to be successful. In addition to improving the efficiency of network and device resource utilization, the systems and methods described herein can provide more robust systems by, for example, making more efficient use of network devices and user devices by reducing unnecessary and/or unproductive device and network interactions, thereby freeing network and user device resources for more productive operations.

An illustrative environment and illustrative techniques for implementing smart UE cell selection and reselection systems and techniques are described below. However, the described techniques may be implemented in other environments.

Illustrative System Architecture

FIG. 1 is a schematic diagram of an illustrative wireless network environment 100 in which the disclosed systems and techniques may be implemented. The environment 100 may include base stations 120, 130, 140, and 150. Each of the base stations 120, 130, 140, and 150 may be any type of base station, including, but not limited to, a BTS, a NodeB, an eNodeB, a gNodeB, etc. Each of the base stations 120, 130, 140, and 150 may provide wireless communications service for one or more geographical areas or sectors, typically referred to as cells. Such cells may be geographically distinct (although they may overlap) due to the implementation of beamforming and directional antenna technologies. For example, as shown in the figure, base station 120 may provide service for cells 122, 124, and 126; base station 130 may provide service for cells 132, 134, and 136; base station 140 may provide service for cells 142, 144, and 146; and base station 150 may provide service for cells 152, 154, and 156. Cells may be grouped into a larger contiguous geographical areas referred to as a tracking areas. In FIG. 1, the cells 122, 124, 126, 132, 134, 136, 142, 144, 146, 152, 154, and 156 may be cells within a tracking area 110. The tracking area 110 may, in some examples, also include one or more other cells that may be associated with one or more other base stations and/or with any of the base stations 120, 130, 140, and 150.

A UE 160 may be operating in the general vicinity of the tracking area 110. The UE 160 may be any type of wireless device capable of wirelessly interacting with one or more of the base stations 120, 130, 140, and 150, (e.g., a smartphone, a cellular telephone, etc.).

The base station 130 may be configured to transmit (e.g., broadcast) a SIB 170 in the area of one or more of its cells. For example, the base station 170 may broadcast the SIB 170 with IEs that indicate information or data associated with the cell 134. This information may include a PLMN identifier or list of PLMN identities 172, a TAC 174, a cell ID 176, a frequency band 178, and a frequency sub-band 180.

The PLMN identifier 172 may indicate the network or network operator with which the base station 130 and/or the cell 134 is associated (e.g., a numeric code indicating an MNC and an MCC). The TAC 174 may be an identifier for the tracking area 110. The cell ID 176 may be an identifier for the cell 134 (e.g., an ECI). The frequency band 178 may be an identifier for the operational frequency band for the cell 134. The frequency sub-band 180 may indicate a frequency sub-band in which the cell 134 may operate. In various examples, the frequency sub-band IE 180 may indicate a center frequency (e.g., an ARFCN or a NR-ARFCN) and a number of PRBs that, used together, may indicate a frequency range, for example, within the frequency band indicated by the frequency band 178.

The UE 160 may receive the SIB 170 and use the data indicated therein to determine whether to attempt to camp on the cell 134. For example, the UE 160 may determine whether the UE is compatible with or otherwise capable of communicating using the frequency band 178 indicated in the SIB 170. In some examples, the band in which the cell 134 is operating may actually be a subset of the frequency band 178 indicated in the SIB 170 as the frequency sub-band 180. If the UE 160 is capable of operating in a different subset of the frequency band 178 but not compatible with the subset of the frequency band 178 that is used to service the cell 134, the UE 160 may not be able recognize or otherwise understand the frequency sub-band IE 180 indicated in the SIB 170. The UE 160 may then treat the cell 134 as barred and may determine not to establish a communications session with the base station 130 in the cell 134 (e.g., not to camp on the cell 134).

For example, the frequency band 178 may be an identifier of a frequency band of 3.3 GHz-4.2 GHz, but the cell 134 may actually operate (e.g., operate a control channel) within the 3.4 GHz-3.6 GHz subset of that band. The 3.4 GHz-3.6 GHz subset of the band may be indicated by the frequency sub-band IE 180 in the SIB 170. If the UE 160 is capable of operating in the 3.7 GHz-4.0 GHz subset of the 3.3 GHz-4.2 GHz band but not in the 3.4 GHz-3.6 GHz subset, the UE 160 may not detect or understand the frequency sub-band IE 180 in the SIB 170 and may therefore not be able to camp on that cell, for instance, because it trats the cell 134 as barred response to being unable to recognize an IE (e.g., frequency sub-band IE 180) in the SIB 170 associated with the cell 134.

In another particular example, the SIB 170 may include a frequency band indicator 178 that identifies the frequency at which the cell 134 operates as the n77 band. However, if the cell 134 is operating in the DoD band subset of the n77 band and the UE 160 is only capable of operating in the C-band subset of the n77 band, the UE 160 will not be able to camp on the cell 134. In such an example, the SIB 170 may include a frequency sub-band IE 180 that indicates the DoD band subset of the n77 band. Since the UE 160 may not be able to understand or recognize the frequency sub-band IE 180, the UE 160 may treat the cell 134 as barred.

In response to an unrecognized frequency sub-band 180 IE and/or in response to a failure to establish a communications session in the cell 134 or otherwise successfully camp on the cell 134, the UE 160 may determine that the cell 134 is barred (e.g., for the UE 160). Because the cell 134 is not available for camping at the frequency band 178 to the UE 160, it is unlikely that any other cell within the TAC 110 will be available for camping to the UE 160 at the frequency band 178. In response to this determination, the UE 160 may store an entry in its UE barred list 162 for the frequency band 178 and the TAC 174 (e.g., an indication of a both or a combination of the band 178 and the TAC 174).

When the UE 160 receives a subsequent SIB, it may evaluate the subsequent SIB using the UE barred list 162 to determine whether it is associated with a barred TAC/band combination. For example, the UE 160 may receive a subsequent SIB 190 from the base station 130 for the same cell 134. The UE 160 may determine that the SIB 190 indicates the TAC 174 and the frequency band 178. The UE 160 may evaluate this data against the entries stored in the UE barred list 162 and determine that the TAC and frequency band combination indicated in the SIB 190 corresponds to an entry in the UE barred list 162. In response to this determination, the UE 160 may not make an attempt (e.g., another attempt) to camp on the cell 134 and/or perform other actions associated with efforts to establish communications with the cell 134.

The UE 160 may evaluate any received SIB against its UE barred list 162. For example, the UE 160 may receive a subsequent SIB 192 from the base station 150 for the cell 154. The SIB 192 may include information about the cell 154, including the information described herein in regard to the SIB 170 (note only the TAC and frequency band for the SIB 192 shown in the figure for brevity). The UE 160 may determine that the SIB 192 indicates the TAC 174 and the frequency band 178. The UE 160 may evaluate this data against the entries stored in the UE barred list 162 and determine that the TAC and band combination indicated in the SIB 192 corresponds to an entry in the UE barred list 162. In response to this determination, the UE 160 may not make an attempt to camp on the cell 154 and/or perform other actions associated with efforts to establish communications with the cell 154.

By maintain a listing of barred TAC and frequency band combinations, the UE 160 may make more efficient use of memory and network resources than if it tracked individual cells and frequency combinations and may thereby conserve battery resources as well. For example, the UE 160 does not have to determine that each of the cells in the tracking area 110 is unavailable to it by attempting to evaluate camp on each such cell. Instead, by determining that one cell in the tracking area 110 is barred, the UE 160 may then store an entry in the UE barred list 162 for TAC 174 and thereby avoid attempting to camp on any other cells in the tracking area 110 and/or perform other actions associated with efforts to establish communications with other cells in the tracking area 110.

Figure 3:
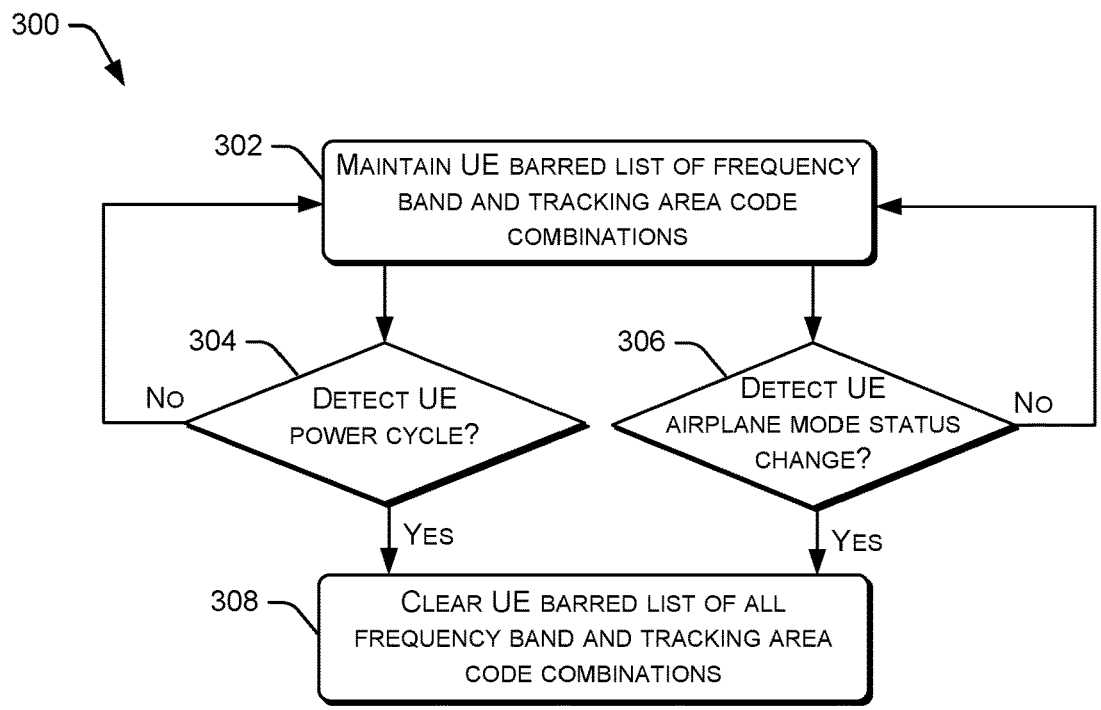
FIG. 3 is another flow diagram of an illustrative process for performing UE cell selection and reselection, in accordance with examples of the disclosure.

As described herein, the UE 160 may maintain the entries in the UE barred list until a power cycle or airplane mode cycle has been performed (see, e.g., FIG. 3 and associated discussion).

Illustrative Operations

Figure 2:
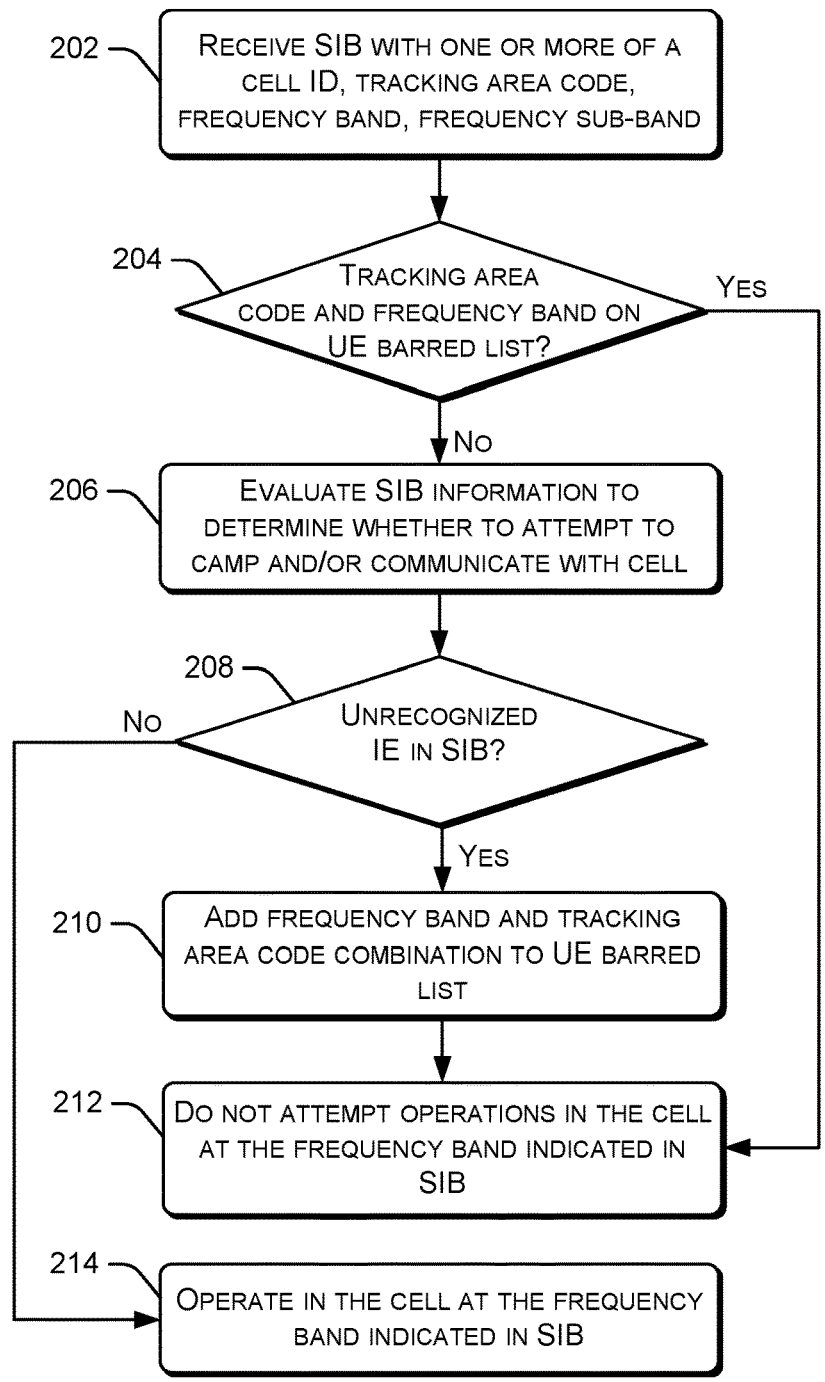
FIG. 2 is a flow diagram of an illustrative process for performing UE cell selection and reselection, in accordance with examples of the disclosure.

FIG. 2 shows a flow diagram of an illustrative process 200 for performing smart UE cell selection and reselection according to the disclosed embodiments. The process 200 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 200 is described with reference to the wireless network environment 100 of FIG. 1, however other environments may also be used.

At block 202, a UE, such as the UE 160, may receive a SIB, such as any of the SIBs 170, 190, and 192 described above. The received SIB may contain, among other data, identifiers for one or more of a cell ID, a tracking area, a frequency band, and/or a frequency sub-band.

At block 204, the UE may determine whether the frequency band and TAC indicated in the SIB correspond to one or more entries in the UE's barred list. If so, the process 200 may proceed to the block 212 where the UE may determine not to attempt to camp or otherwise attempt operations in the cell associated with the SIB received at the block 202 because the UE has already determined (as indicated by the presence of the entry on the UE barred list) that cells in the TAC indicated in the SIB operating at the frequency indicated in the SIB are not compatible with the UE.

If, at block 204, the UE determines that the frequency band and TAC indicated in the SIB do not correspond to one or more entries in the UE's barred list, at block 206 the UE may evaluate the information indicated in the SIB to determine whether to attempt to camp or otherwise operate in the cell indicated in the SIB. In evaluating the SIB information, the UE may determine at block 208 whether it is likely to successfully camp on the cell associated with the SIB and/or communicate with that cell's base station using the information indicated in the SIB received at the block 202.

For example, at block 206, the UE may determine that the UE is capable of communicating with a base station associated with the cell indicated in the SIB received at block 202 because the UE is a legacy UE and the SIB does not include any unrecognizable (to the legacy UE) IEs, such as those that would indicate a sub-band. Alternatively, the UE may determine that the UE is not capable of communicating with a base station associated with the cell indicated in the SIB received at block 202 because the UE is a legacy UE and the SIB includes a sub-band identifier that the legacy UE does not recognize. In another example, the UE may determine that the UE is capable of communicating with a base station associated with the cell indicated in the SIB received at block 202 because the UE is a current (non-legacy) UE and the SIB includes a sub-band identifier that is understood by the current UE.

At block 208, the UE may determine whether the UE recognized (e.g., all) the data within the SIB or whether there were one or more unrecognized IEs in the SIB. For example, the UE may be configured to operate in a particular subset of the frequency band indicated in by a sub-band identifier the SIB received at the block 202. The UE may be capable of recognizing that sub-band identifier and therefore may be capable of camping in the associated cell. Alternatively, the UE and the cell may operate using the entirety of the band indicated in the SIB (e.g., there may be no sub-band identifier in the SIB). If the UE and the base station of the cell indicated in the SIB can successfully communicate, the process 200 may proceed to the block 214 where the UE camps on the cell indicated in the SIB and/or otherwise operates in the cell.

If the UE determines, at block 208, that the SIB includes one or more unrecognized IEs (e.g., a sub-band IE unrecognizable to a legacy UE), the UE may, at block 210, add an entry into a UE barred list indicating the TAC and frequency band indicated in the SIB (e.g., data representing a combination of TAC and frequency band). For example, as described herein, the UE may be configured to operate in a particular subset of the frequency band indicated in the SIB received at the block 202 that may be a different subset if the frequency band than the subset of the frequency band that is used in the cell indicated in the SIB. The SIB may include a sub-band identifier IE for the subset of the frequency band that is used in the cell that the UE does not recognize. The UE may then add an entry reflecting the associated TAC and band to its UE barred list in response.

At block 212, the UE may treat the cell associated with the SIB having an unrecognized IE as barred. The UE may determine not to attempt to camp or otherwise operate in the cell associated with the SIB received at the block 202. The UE may refrain from attempting to camp or otherwise operating in the cell in response to this determination.

FIG. 3 shows a flow diagram of an illustrative process 300 for performing smart UE cell selection and reselection barred list resets according to the disclosed embodiments. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 is described with reference to the wireless network environment 100 of FIG. 1, however other environments may also be used.

At block 302, a UE, such as the UE 160, may maintain a listing of barred TAC and frequency band combinations (also referred to herein as a "UE barred list") that includes one or more entries representing a TAC and a frequency band, or a combination thereof, as described herein.

At block 304, the UE may determine whether the UE has detected a power cycle. In various embodiments, the UE may detect the initiation of a power down operation. Alternatively or in addition, at block 304 the UE may detect a power up operation. In response to either of these power cycle conditions, the UE may, at block 308, clear, reset, and/or otherwise delete one or more (e.g., all) entries in its listing of barred TAC and frequency band combinations. If the UE does not detect a power cycle at block 304, the UE may continue to maintain its UE barred list.

Alternatively, or in addition, at block 306 the UE may determine whether the UE has detected an airplane mode condition or condition change. In various embodiments, the UE may detect when the UE enters "airplane mode" or another condition where wireless communications are disabled (e.g., in response to detecting an instruction to enter such a condition). Alternatively or in addition, at block 306 the UE may detect when the UE exits "airplane mode" or another condition where wireless communications are disabled (e.g., in response to detecting an instruction to exit such a condition and/or enable wireless communications). In response to either of these airplane mode conditions, the UE may, at block 308, clear, reset, and/or otherwise delete one or more (e.g., all) entries in its listing of barred TAC and frequency band combinations. If the UE does not detect an airplane mode condition or condition change at block 306, the UE may continue to maintain its UE barred list.

In summary, by storing data representing many barred cells as TAC/band combinations and preventing many unnecessary camping requests and other resource utilizations, the disclosed systems and techniques may be able to increase the efficiency of usage of UE resources and network resources, improving the user experience and performance of both the network and user devices.

Illustrative Data Structures

Figure 4:
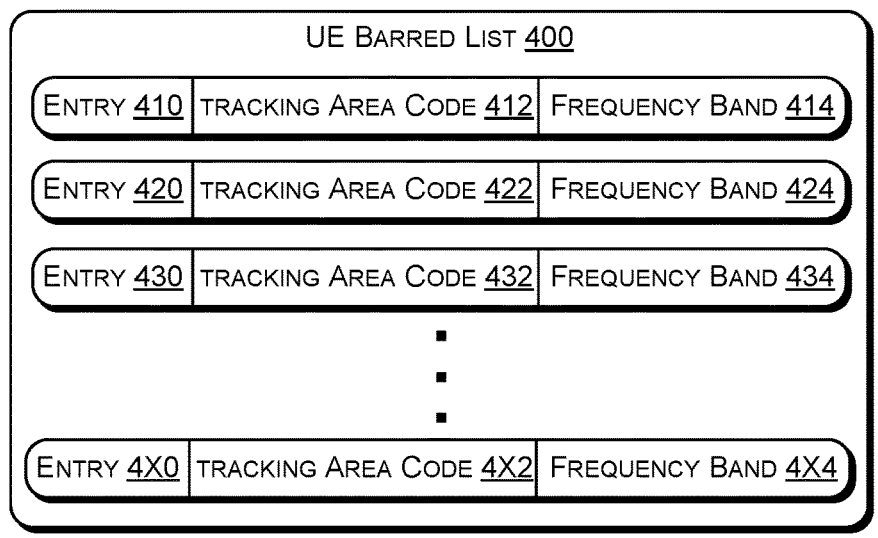
FIG. 4 is a schematic diagram of UE barred list of training area code and frequency band combinations, in accordance with examples of the disclosure.

FIG. 4 shows a block diagram representing an illustrative data structure 400 ("UE Barred List 400") that may include data indicating a listing of barred TAC and frequency band combinations. As shown in this figure, the data structure 400 may include one or more entries 410, 420, 430 . . . 4X0. Each of these entries may have data representing a TAC and an associated frequency band. For example, entry 410 may have a corresponding TAC indicator 412 and band indicator 414, entry 420 may have a corresponding TAC indicator 422 and band indicator 424, entry 430 may have a corresponding TAC indicator 432 and band indicator 434, and so forth.

In various embodiments, the entries 410, 420, 430 . . . 4X0 may include a simple concatenation of a TAC and a band identifier. Alternatively, the entries 410, 420, 430 . . . 4X0 may include any other type of representation of a TAC and a frequency band. All such embodiments are contemplated as within the scope of the instant disclosure.

Example User Equipment

Figure 5:
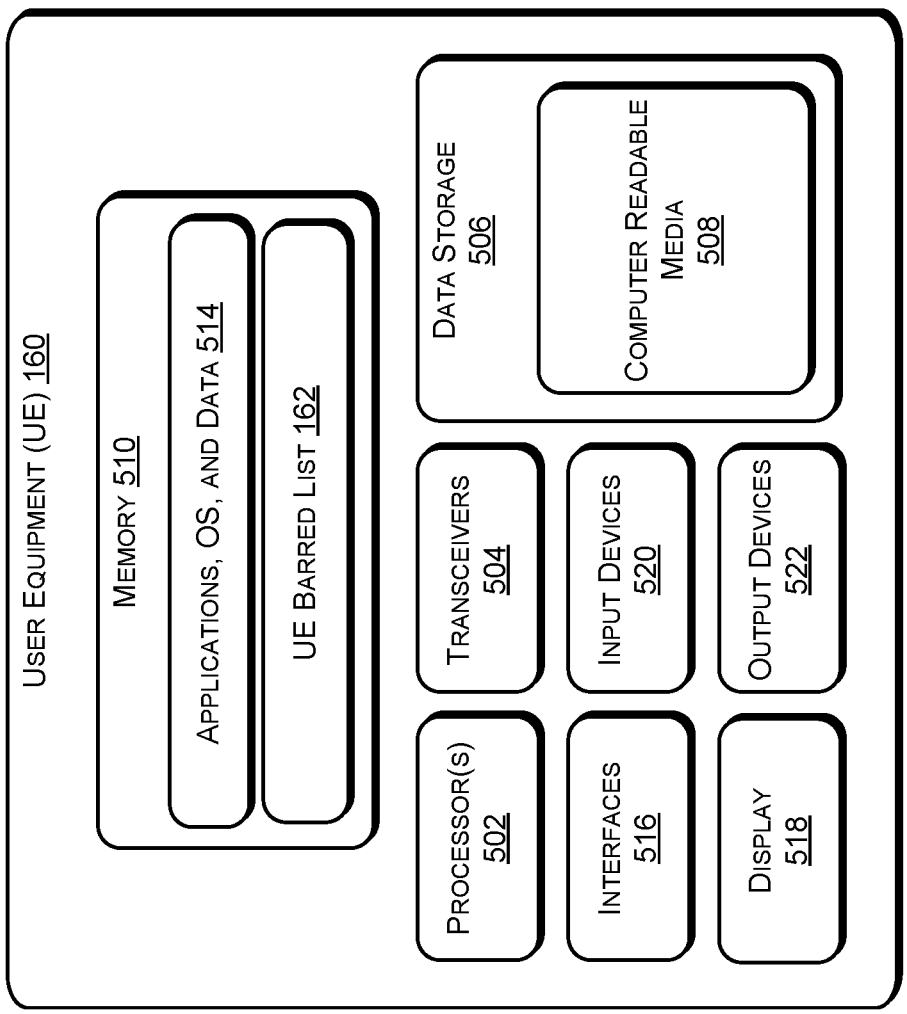
FIG. 5 is a schematic diagram of illustrative components in an example user device that is configured for UE cell selection and reselection, in accordance with examples of the disclosure.

FIG. 5 is an example of a UE, such as UE 160, for use with the systems and methods disclosed herein, in accordance with some examples of the present disclosure. The UE 160 may include one or more processors 502, one or more transmit/receive antennas (e.g., transceivers or transceiver antennas) 504, and a data storage 506. The data storage 506 may include a computer readable media 508 in the form of memory and/or cache. This computer-readable media may include a non-transitory computer-readable media. The processor(s) 502 may be configured to execute instructions, which can be stored in the computer readable media 508 and/or in other computer readable media accessible to the processor(s) 502. In some configurations, the processor(s) 502 is a Central Processing Unit (CPU), a Graphics Processing Unit (GPU), or both CPU and GPU, or any other sort of processing unit. The transceiver antenna(s) 504 can exchange signals with a base station, such as any of the base stations 120, 130, 140, 150.

The UE 160 may be configured with a memory 510. The memory 610 may be implemented within, or separate from, the data storage 506 and/or the computer readable media 508. The memory 510 may include any available physical media accessible by a computing device to implement the instructions stored thereon. For example, the memory 510 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 160.

The memory 510 can store several modules, such as instructions, data stores, and so forth that are configured to execute on the processor(s) 502. For instance, the memory 510 may store a UE barred list 162 as described herein that may be used in a smart UE cell selection and reselection system. In configurations, the memory 510 may also store one or more applications 514 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the base stations 120, 130, 140, 150, other UEs, etc.). The applications 514 may also include one or more operating systems and/or one or more third-party applications that provide additional functionality to the UE 160.

Although not all illustrated in FIG. 5, the UE 160 may also comprise various other components, e.g., a battery, a charging unit, one or more network interfaces 516, an audio interface, a display 518, a keypad or keyboard, and one or more input devices 520, and one or more output devices 522.

Example Clauses

A: A method performed by a mobile device, the method comprising: receiving a first system information block from a first base station, the first system information block indicating a first cell, a first tracking area, and a first frequency band; initiating first communications operations in the first cell based at least in part on the first frequency band; determining that initiating the first communications operations in the first cell was unsuccessful; based at least in part on determining that initiating the first communications operations in the first cell was unsuccessful, storing an indicator of the first tracking area and an indicator of the first frequency band in a memory of the mobile device; receiving a second system information block from a second base station, the second system information block indicating a second cell, a second tracking area, and a second frequency band; determining that the second tracking area corresponds to the first tracking area based at least in part on the indicator of the first tracking area; determining that the second frequency band corresponds to the first frequency band based at least in part on the indicator of the first frequency band; and based at least in part on determining that the second tracking area corresponds to the first tracking area and that the second frequency band corresponds to the first frequency band, determining to refrain from initiating second communications operations in the second cell.

B: The method of paragraph A, wherein initiating the first communications operations in the first cell based at least in part on the first frequency band comprises determining that the first system information block comprises an unrecognized information element.

C: The method of paragraph B, wherein: the unrecognized information element indicates a second subset of frequencies within the first frequency band within which the first cell operates; and the second subset of frequencies is distinct from a first subset of frequencies within which the mobile device operates.

D: The method of paragraph B, wherein storing the indicator of the first tracking area and the indicator of the first frequency band is further based at least in part on determining that the first system information block comprises the unrecognized information element.

E: The method of any of paragraphs A-D, wherein the first cell is a distinct cell from the second cell.

F: The method of paragraph E, wherein the first base station is a same base station as the second base station.

G: A mobile device comprising: one or more processors; one or more transceivers; and non-transitory computer-readable media storing computer-executable instructions that, when executed by the one or more processors, cause the one or more processors to perform operations comprising: receiving a system information block from a base station, the system information block indicating a cell, a tracking area, and a frequency band; determining that the tracking area corresponds to a tracking area identifier stored in the non-transitory computer-readable media; determining that the frequency band corresponds to a frequency band identifier stored in the non-transitory computer-readable media; and based at least in part on determining that the tracking area corresponds to the tracking area identifier and that the frequency band corresponds to the frequency band identifier, determining to refrain from initiating communications operations in the cell.

H: The mobile device of paragraph G, wherein the operations further comprise: receiving a second system information block from a second base station, the second system information block indicating a second cell, a second tracking area, and a second frequency band; determining that the second tracking area does not correspond to at least one of one or more tracking area identifiers stored in the non-transitory computer-readable media; determining that the second frequency band does not correspond to at least one of one or more frequency band identifiers stored in the non-transitory computer-readable media; and based at least in part on determining that the second tracking area does not correspond to at least one of the one or more tracking area identifiers and that the second frequency band does not correspond to at least one of the one or more frequency band identifiers, initiating second communications operations in the second cell.

I: The mobile device of paragraph G or H, wherein the system information block further indicates a frequency sub-band within which the mobile device is not configured to operate.

J: The mobile device of any of paragraphs G-I, wherein: the base station operates the cell using a first subset of frequencies within the frequency band; the mobile device performs the communications operations using a second subset of frequencies within the frequency band; and the second subset of frequencies is distinct from the first subset of frequencies.

K: The mobile device of paragraph J, wherein: the frequency band is associated with an n77 band; the first subset of frequencies is associated with a DoD band; and the second subset of frequencies is associated with a C-band.

L: The mobile device of any of paragraphs G-K, wherein the operations further comprise: detecting a change of a condition of the mobile device; and based at least in part on detecting the change of the condition, deleting the tracking area identifier and the frequency band identifier from the non-transitory computer-readable media.

M: The mobile device of paragraph L, wherein the change of the condition is a change in airplane mode condition of the mobile device.

N: The mobile device of paragraph L, wherein the change of the condition is a power cycle of the mobile device.

O: A non-transitory computer-readable media storing computer-executable instructions that, when executed by one or more processors, cause the one or more processors to perform operations comprising: receiving a system information block from a first base station, the system information block indicating a first cell, a first tracking area, a first frequency band, and a first frequency sub-band; determining that an information element representing the first frequency sub-band in the first system information block is not recognized; based at least in part on determining that the information element representing the first frequency sub-band is not recognized, storing an indicator of the first tracking area and an indicator of the first frequency band; and determining to refrain from initiating communications operations in a second cell based at least in part on: determining that a second tracking area associated with the second cell corresponds to the first tracking area; and determining that a second frequency band associated with the second cell corresponds to the first frequency band.

P: The non-transitory computer-readable media of paragraph O, wherein the operations further comprise determining to initiate second communications operations in a third cell based at least in part on determining at least one of: a third tracking area associated with the third cell does not correspond to the first tracking area; or a third frequency band associated with the third cell does not correspond to the first frequency band.

Q: The non-transitory computer-readable media of paragraph O or P, wherein the first base station operates the first cell using the first frequency sub-band that is distinct from a second frequency sub-band used to perform the communications operations.

R: The non-transitory computer-readable media of any of paragraphs O-Q, wherein the first cell is a distinct cell from the second cell.

S: The non-transitory computer-readable media of any of paragraphs O-R, wherein determining to refrain from initiating the communications operations in the second cell is further based at least in part on receiving a second system information block indicating the second tracking area and the second frequency band.

T: The non-transitory computer-readable media of any of paragraphs O-S, wherein the operation further comprise: detecting a change of a condition of a mobile device; and based at least in part on detecting the change of the condition, deleting the indicator of the first tracking area and the indicator of the first frequency band.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a mobile device, the method comprising:
   receiving a first system information block from a first base station, the first system information block indicating a first cell, a first tracking area, and a first frequency band;
   initiating first communications operations in the first cell based at least in part on the first frequency band;
   determining that initiating the first communications operations in the first cell was unsuccessful;
   based at least in part on determining that initiating the first communications operations in the first cell was unsuccessful, storing an indicator of the first tracking area and an indicator of the first frequency band in a memory of the mobile device;
   receiving a second system information block from a second base station, the second system information block indicating a second cell, a second tracking area, and a second frequency band;
   determining that the second tracking area corresponds to the first tracking area based at least in part on the indicator of the first tracking area;
   determining that the second frequency band corresponds to the first frequency band based at least in part on the indicator of the first frequency band;
   based at least in part on determining that the second tracking area corresponds to the first tracking area and that the second frequency band corresponds to the first frequency band, determining to refrain from initiating second communications operations in the second cell; and
   maintaining the indicator of the first tracking area and the indicator of the first frequency band in the memory of the mobile device until changing an airplane mode status of the mobile device or until power cycling the mobile device.

2. The method of claim 1, wherein initiating the first communications operations in the first cell based at least in part on the first frequency band comprises determining that the first system information block comprises an unrecognized information element.

3. The method of claim 2, wherein:
   the unrecognized information element indicates a second subset of frequencies within the first frequency band within which the first cell operates; and
   the second subset of frequencies is distinct from a first subset of frequencies within which the mobile device operates.

4. The method of claim 2, wherein storing the indicator of the first tracking area and the indicator of the first frequency band is further based at least in part on determining that the first system information block comprises the unrecognized information element.

5. The method of claim 1, wherein the first cell is a distinct cell from the second cell.

6. The method of claim 5, wherein the first base station is a same base station as the second base station.

7. A mobile device comprising:
   one or more processors;
   one or more transceivers; and
   non-transitory computer-readable media storing computer-executable instructions that, when executed by the one or more processors, cause the one or more processors to perform operations comprising:
      receiving a system information block from a base station, the system information block indicating a cell, a tracking area, and a frequency band;
      determining that the tracking area corresponds to a tracking area identifier stored in the non-transitory computer-readable media;
      determining that the frequency band corresponds to a frequency band identifier stored in the non-transitory computer-readable media;
      based at least in part on determining that the tracking area corresponds to the tracking area identifier and that the frequency band corresponds to the frequency band identifier, determining to refrain from initiating communications operations in the cell; and
      maintaining the tracking area identifier and the frequency band identifier from in the non-transitory computer-readable media until changing an airplane mode status of the mobile device or until power cycling the mobile device.

8. The mobile device of claim 7, wherein the operations further comprise:
   receiving a second system information block from a second base station, the second system information block indicating a second cell, a second tracking area, and a second frequency band;
   at least one of:
      determining that the second tracking area does not correspond to at least one of one or more tracking area identifiers stored in the non-transitory computer-readable media, or
      determining that the second frequency band does not correspond to at least one of one or more frequency band identifiers stored in the non-transitory computer-readable media; and
   based at least in part on determining that the second tracking area does not correspond to at least one of the one or more tracking area identifiers or that the second frequency band does not correspond to at least one of the one or more frequency band identifiers, initiating second communications operations in the second cell.

9. The mobile device of claim 7, wherein the system information block further indicates a frequency sub-band within which the mobile device is not configured to operate.

10. The mobile device of claim 7, wherein:
    the base station operates the cell using a first subset of frequencies within the frequency band;
    the mobile device performs the communications operations using a second subset of frequencies within the frequency band; and
    the second subset of frequencies is distinct from the first subset of frequencies.

11. The mobile device of claim 10, wherein:
the frequency band is associated with an n77 band;
the first subset of frequencies is associated with a DoD band; and
the second subset of frequencies is associated with a C-band.

12. The mobile device of claim 7, wherein the operations further comprise:
detecting a change of a condition of the mobile device; and
based at least in part on detecting the change of the condition, deleting the tracking area identifier and the frequency band identifier from the non-transitory computer-readable media.

13. A non-transitory computer-readable media storing computer-executable instructions that, when executed by one or more processors, cause the one or more processors to perform operations comprising:
receiving a system information block from a first base station, the system information block indicating a first cell, a first tracking area, a first frequency band, and a first frequency sub-band;
determining that an information element representing the first frequency sub-band in the first system information block is not recognized;
based at least in part on determining that the information element representing the first frequency sub-band is not recognized, storing an indicator of the first tracking area and an indicator of the first frequency band, in memory associated with the one or more processors;
determining to refrain from initiating communications operations in a second cell based at least in part on:
determining that a second tracking area associated with the second cell corresponds to the first tracking area, or
determining that a second frequency band associated with the second cell corresponds to the first frequency band;
maintaining the indicator of the first tracking area and the indicator of the frequency band in the memory until changing an airplane mode status of a device associated with the memory or until power cycling the device.

14. The non-transitory computer-readable media of claim 13, wherein the operations further comprise determining to initiate second communications operations in a third cell based at least in part on determining at least one of:
a third tracking area associated with the third cell does not correspond to the first tracking area; or
a third frequency band associated with the third cell does not correspond to the first frequency band.

15. The non-transitory computer-readable media of claim 13, wherein the first base station operates the first cell using the first frequency sub-band that is distinct from a second frequency sub-band used to perform the communications operations.

16. The non-transitory computer-readable media of claim 13, wherein the first cell is a distinct cell from the second cell.

17. The non-transitory computer-readable media of claim 13, wherein determining to refrain from initiating the communications operations in the second cell is further based at least in part on receiving a second system information block indicating the second tracking area and the second frequency band.

18. The non-transitory computer-readable media of claim 13, wherein the operation further comprise:
detecting a change of a condition of a mobile device; and
based at least in part on detecting the change of the condition, deleting the indicator of the first tracking area and the indicator of the first frequency band.

* * * * *